United States Patent [19]

Stoneham et al.

[11] Patent Number: 5,280,327
[45] Date of Patent: Jan. 18, 1994

[54] CASSETTE RE-LOAD PREVENTION APPARATUS

[75] Inventors: Jeffrey R. Stoneham, Spencerport; Joel S. Lawther, Rochester, both of N.Y.

[73] Assignee: Eastman Kodak Company, Rochester, N.Y.

[21] Appl. No.: 909,348

[22] Filed: Jul. 6, 1992

[51] Int. Cl.$^5$ .............................................. G03B 17/26
[52] U.S. Cl. .................................... 354/275; 242/71.1
[58] Field of Search ........................ 354/275; 242/71.1

[56] References Cited

U.S. PATENT DOCUMENTS

| 3,784,001 | 1/1974 | Bushnell et al. | 242/71.1 |
| 4,682,870 | 7/1987 | Atkinson | 354/275 |
| 4,987,437 | 1/1991 | Pagano et al. | 354/275 |
| 4,994,828 | 2/1991 | Smart | 354/21 |
| 4,994,833 | 2/1991 | Cocca | 354/207 |
| 4,998,123 | 3/1991 | Smart | 354/275 |
| 5,032,854 | 7/1991 | Smart et al. | 354/21 |
| 5,032,861 | 7/1991 | Pagano | 354/275 |
| 5,032,862 | 7/1991 | Behnke | 354/275 |
| 5,047,794 | 9/1991 | Pagano et al. | 354/275 |

Primary Examiner—Michael L. Gellner
Assistant Examiner—J. K. Han
Attorney, Agent, or Firm—Roger A. Fields

[57] ABSTRACT

Load prevention apparatus is to be used with a film cassette which has a frangible exterior label covering a trap-like cavity in the cassette. The apparatus comprises a loading chamber configured to receive the cassette, blocking means arranged in the chamber to be admitted into the trap-like cavity for engaging the cassette to prevent further insertion of the cassette into the chamber but supported to be moved by the exterior label out of the way of the trap-like cavity to avoid engaging the cassette, and fracturing means arranged in the chamber for breaking the exterior label to uncover the trap-like cavity after the blocking means is moved by the exterior label out of the way of the trap-like cavity, whereby the blocking device will prevent insertion of the cassette into the chamber a second time.

2 Claims, 3 Drawing Sheets

CASSETTE RE-LOAD PREVENTION APPARATUS

CROSS-REFERENCE TO RELATED APPLICATIONS

Reference is made to commonly assigned copending application Ser. No. 07/909,472, entitled FILM CASSETTE WITH FRANGIBLE SPOOL LOCK AND CAM and filed Jul. 6, 1992 in the names of Jeffrey R. Stoneham and Joel S. Lawther, and Ser. No. 880783, entitled FILM CASSETTE AND ASSOCIATED CAMERA DEVICE and filed May 11, 1992 in the names of Daniel M. Pagano and Stephen H. Miller.

BACKGROUND OF THE INVENTION

1. Field of the Invention

The invention related generally to the field of photography, and in particular to apparatus for preventing the loading of a film cassette into a chamber or the like in a camera, for example. More specifically, the invention relates to apparatus to be used with a film cassette having frangible means that initially operates as a spool lock and as a cam for moving a blocking device of the apparatus out of the way of the cassette when the cassette is first loaded into a chamber but which when broken by a fracturing device of the apparatus is rendered inoperative as a spool lock and as a cam.

2. Description of the Prior Art

Commonly assigned U.S. Pat. No. 5,047,794, issued Sep. 10, 1991 and U.S. Pat. No. 5,032,861, issued Jul. 16, 1991, each disclose a film cassette having an internal spool lock that is moved by a cam pin in the loading chamber of a camera from a locking position to a non-locking position as the cassette is inserted into the loading chamber and that is moved by a leaf spring in the loading chamber from the non-locking position to the locking position as the cassette is withdrawn from the loading chamber. Also, the cassette has cam formed on its housing for moving a blocking device in the loading chamber out of the way of the cassette as the cassette is inserted into the loading chamber. However, when a film exposure status indicator of the cassette is in a film exposed (used) position, the status indicator covers the cam. Consequently, the blocking device will engage the cassette to prevent the cassette from being inserted into the loading chamber.

Prior art U.S. Pat. No. 3,784,001, issued Jan. 8, 1974, discloses a film cassette in which there is a frangible connection between a film spool and an internal wall of the cassette. The frangible connection has sufficient strength to prevent the spool from rotating during handling of the cassette prior to use but which will break when a filmstrip wound on the spool is first pulled off the spool. Since the frangible connection is located inside the cassette, there is no visible way of knowing when it is broken.

Prior art U.S. Pat. No. 4,683,870, issued Jul. 28, 1987, discloses a film cassette in which a film spool has a coaxial opening containing a frangible piece. When the cassette is loaded into a camera, a shaft is received in the coaxial opening to fracture the frangible piece to provide a visible indication the cassette is used.

THE CROSS-REFERENCED APPLICATIONS

Cross-referenced application Ser. No. 880783 relates to a film cassette having a frangible label for preventing rotation of a film spool and to a camera device that breaks the label to permit rotation of the spool.

Cross-referenced application Ser. No. 07/909,472 relates to a film cassette for use with the load prevention apparatus disclosed in this application.

SUMMARY OF THE INVENTION

According to the invention, there is provided load prevention apparatus to be used with a film cassette which has a frangible exterior label covering a trap-like cavity in the cassette, said apparatus comprising:

a loading chamber configured to receive the cassette;

blocking means arranged in the chamber to be admitted into the trap-like cavity for engaging the cassette to prevent further insertion of the cassette into the chamber but supported to be moved by the exterior label out of the way of the trap-like cavity to avoid engaging the cassette; and fracturing means arranged in the chamber for breaking the exterior label to uncover the trap-like cavity after the blocking means is moved by the exterior label out of the way of the trap-like cavity, whereby the blocking device will prevent insertion of the cassette into the chamber a second time.

DETAILED DESCRIPTION OF THE PREFERRED EMBODIMENT

The invention is disclosed as being embodied preferably in a 35 mm film cassette and a corresponding camera. Because such a cassette and camera are well known, this description is directed only to those elements forming part of or cooperating directly with the invention. It is to be understood, however, that any elements not shown or described may take various forms known to persons having ordinary skill in the art.

Figure 1:
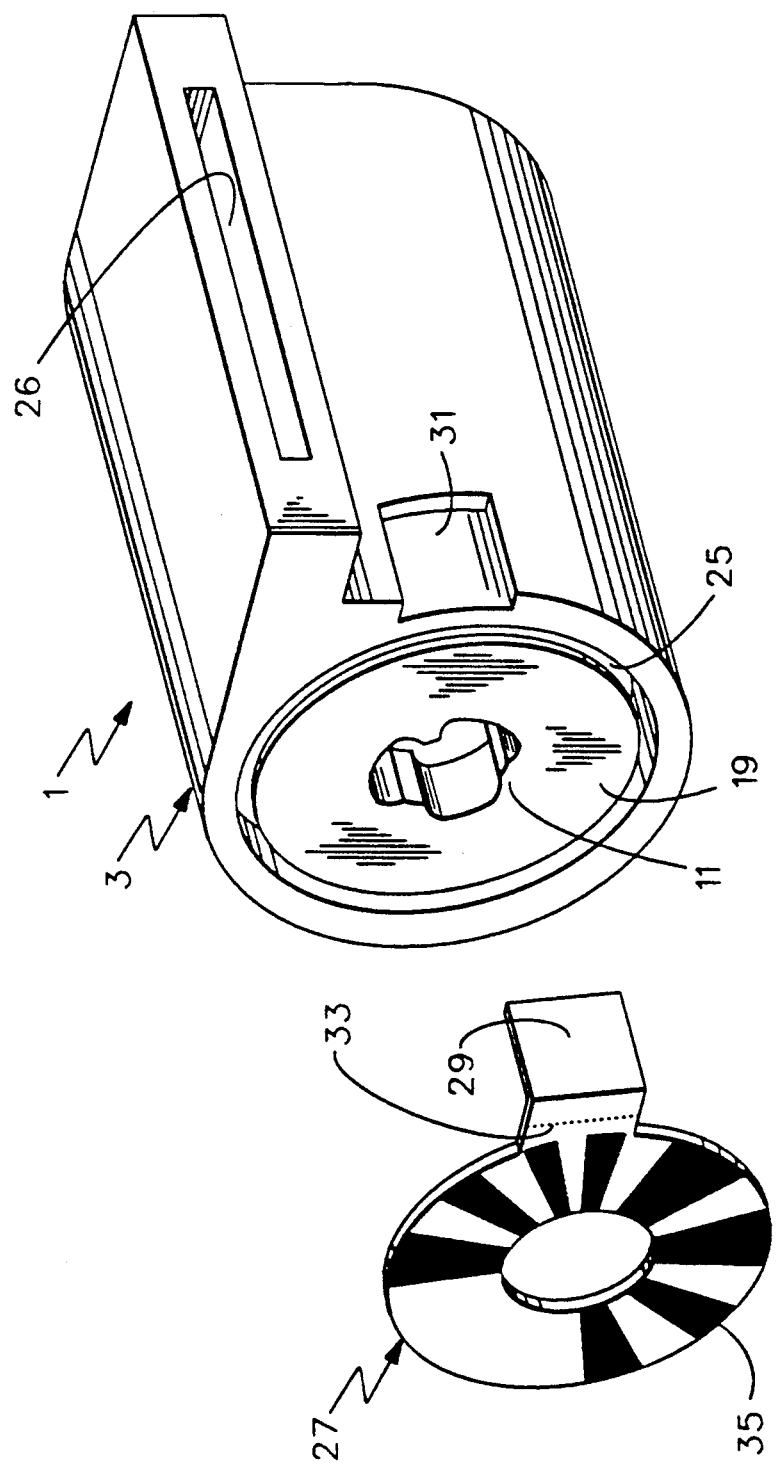
FIG. 1 is a partially exploded perspective view of a film cassette.
Figure 2:
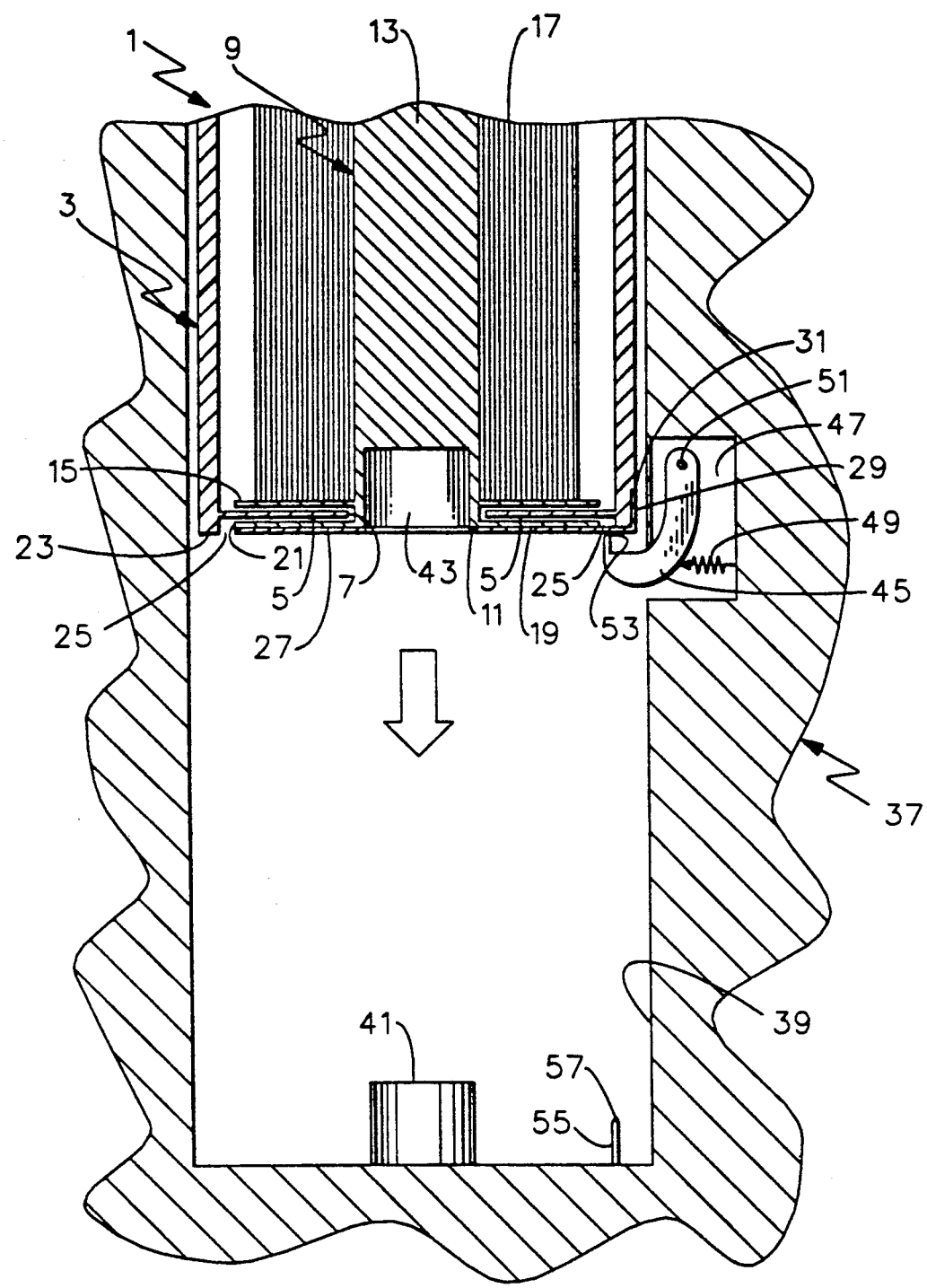
FIGS. 2 and 3 are sectional views of the film cassette and load prevention apparatus for use with the cassette in a camera, for example, depicting various modes of operation of the load prevention apparatus according to a preferred embodiment of the invention.

Referring now to FIGS. 1 and 2 of the drawings, a 35 mm film cassette 1 comprises a lighttight housing or shell 3 having an end face 5 with a central end opening 7, and a rotatable film spool 9 supported inside the housing with one end 11 protruding through the end opening to outside the housing. The film spool 9 includes a spool core 13, a pair of film flanges 15 (only one shown) coaxially spaced apart on the spool core inside the housing to permit a filmstrip 17 to be wound onto the spool core between the flanges, and an end flange 19 located at the one end 11 of the spool core protruding outside the housing. A circumferential (peripheral) edge 21 of the end flange 19 is spaced from an annular end rib 23 of the housing 3 to leave a trap-like gap, void or cavity 25 between the circumferential edge and the end rib. The housing 3 has a film egress/ingress slot 26. Appropriate means (not shown) such as disclosed in commonly assigned U.S. Pat. No. 5,032,861, issued Jul. 16, 1991, is provided for propelling the filmstrip 17 from inside the housing 3 to outside the housing.

A covering label 27 made of paper or very thin plastic to be readily frangible is affixed by glueing to the end flange 19 as shown in FIGS. 1 and 2, and includes an integral tab-like extension 29 which is affixed by glueing to the housing 3 within a recess 31 in the housing. The covering label 27 with the addition of its tab-like extension 29 serves normally to interconnect the film spool 9 and the housing 3 to prevent rotation of the film spool relative to the housing. The tab-like extension 29 has a perforated line of weakness 33 longitudinally extending over the trap-like gap 25 to facilitate breaking or tearing the tab-like extension in order to permit the film spool 9 to rotate. The covering label 27 has a radial bar code 35 similar to the bar code disclosed in commonly assigned U.S. Pat. No. 5,032,854, issued Jul. 16, 1991.

Figure 3:
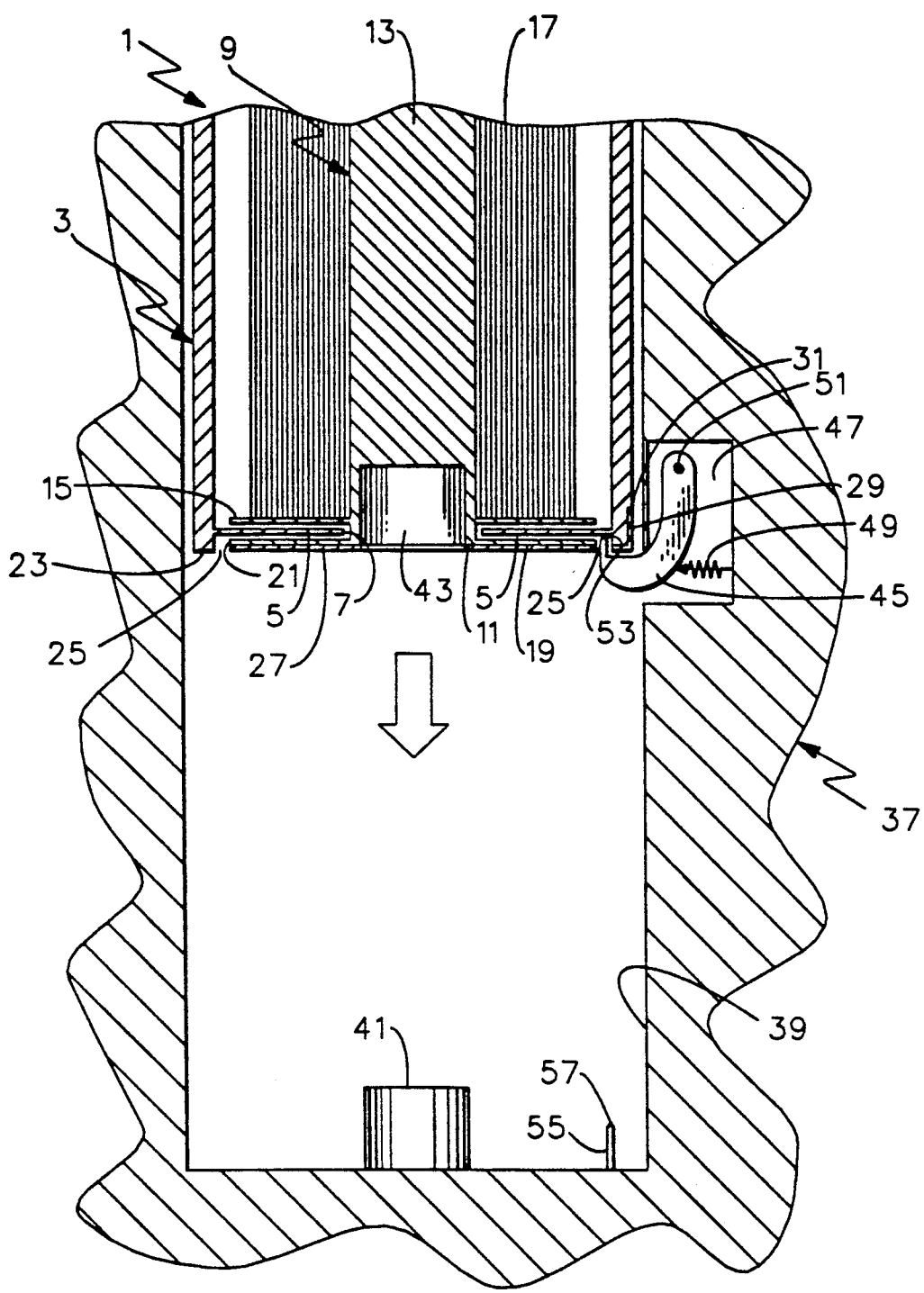

Load prevention apparatus 37 to be used with the film cassette 1 is shown in FIGS. 2 and 3. The load prevention apparatus 37 includes a loading chamber 39 configured to receive the film cassette 1 endwise. A spindle 41 projects from the bottom of the loading chamber 39 for receipt in a coaxial cavity 43 in the spool core 13 to engage and rotatably support the spool core, when the film cassette 1 is inserted completely into the chamber. A blocking lever 45 located within a nest 47 opening to the loading chamber 39 is urged by a compression spring 49 to pivot clockwise in FIG. 2 about a support pin 51 until a hook-like end 53 of the blocking lever protrudes into the loading chamber. In this normal position, the blocking lever 45 is disposed to locate its hook-like end 53 for contact with the particular portion of the tab-like extension 29 of the covering label that lies over the trap-like gap 25, when the film cassette 1 is first inserted into the loading chamber 39. Consequently, the particular portion of the tab-like extension 29 of the covering label 27 that lies over the trap-like gap 25 will cam or pivot the blocking lever 45 counterclockwise in FIG. 2 to a retracted position (not shown) out of the way of the film cassette 1 to allow the cassette to be further inserted into the loading chamber 39. However, should the particular portion of the tab-like extension 29 that lies over the trap-like gap 25 be torn or broken open along its perforated line of weakness 33 to thereby uncover the trap-like gap, the hook-like end 53 of the blocking lever 45 (in its normal position) will be received in the trap-like gap to snag or engage the housing 3 at its end rib 23 to prevent further insertion of the film cassette 1 into the loading chamber 39. See FIG. 3.

A fracturing piece 55 having a label-cutting end 57 aligned with the hook-like end 53 of the blocking lever 45, when the blocking lever is in its normal position shown in FIG. 2, projects from the bottom of the loading chamber 39. The cutting end 57 is arranged to tear or break open the particular portion of the tab-like extension 29 of the covering label 27 that lies over the trap-like gap 25, along the perforated line of weakness 33, when the spool core 33 is seated on the spindle 41. Consequently, the film spool 9 is thus made free to rotate and, of course, the blocking lever 45 will prevent insertion of the film cassette 1 into the loading chamber 39 a second time.

The invention has been described with reference to a preferred embodiment. However, it will be appreciated that various modifications can be effected within the ordinary skill in the art without departing from the scope of the invention.

We claim:

1. Load prevention apparatus to be used with a film cassette which has a frangible exterior label covering a trap-like cavity in the cassette, said apparatus comprising:

a loading chamber configured to receive the cassette;

blocking means arranged in said chamber to be admitted into the trap-like cavity for engaging the cassette to prevent further insertion of the cassette into the chamber but supported to be moved by the exterior label out of the way of the trap-like cavity to avoid engaging the cassette; and fracturing means aligned in said chamber with said blocking means for breaking the exterior label to uncover the trap-like cavity after said blocking means is moved by the exterior label out of the way of the trap-like cavity, to permit the blocking device to prevent insertion of the cassette into said chamber a second time since said fracturing means has broken the exterior label.

2. Cassette load prevention apparatus as recited in claim 1, wherein said fracturing means has a label-cutting end.

* * * * *